(12) United States Patent
McGinnis

(10) Patent No.: US 7,745,800 B1
(45) Date of Patent: Jun. 29, 2010

(54) OMNI-DIRECTIONAL SOLID-STATE THERMAL NEUTRON DETECTOR

(75) Inventor: Wayne C. McGinnis, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 405 days.

(21) Appl. No.: 11/713,835

(22) Filed: Mar. 1, 2007

Related U.S. Application Data

(63) Continuation-in-part of application No. 10/322,813, filed on Dec. 18, 2002, now Pat. No. 7,372,009.

(51) Int. Cl.
*G01T 3/00* (2006.01)
*G01T 3/08* (2006.01)

(52) U.S. Cl. .............................. 250/390.01; 250/370.05

(58) Field of Classification Search ............ 250/370.01, 250/370.04, 370.05, 370.06, 370.09, 370.11, 250/366, 374, 390.01
See application file for complete search history.

(56) References Cited

U.S. PATENT DOCUMENTS

| | | | | |
|---|---|---|---|---|
| 3,760,183 A | * | 9/1973 | Neissel | 250/370.04 |
| 4,419,578 A | * | 12/1983 | Kress | 250/390.01 |
| 5,345,084 A | * | 9/1994 | Byrd | 250/390.12 |
| 5,659,177 A | | 8/1997 | Schulte | |
| 5,665,970 A | * | 9/1997 | Kronenberg et al. | 250/374 |
| 6,072,181 A | * | 6/2000 | Hassard et al. | 250/370.01 |
| 6,388,260 B1 | | 5/2002 | Doty | |
| 6,727,504 B1 | | 4/2004 | Doty | |
| 6,989,541 B2 | | 1/2006 | Penn | |

\* cited by examiner

*Primary Examiner*—David P Porta
*Assistant Examiner*—Faye Boosalis
(74) *Attorney, Agent, or Firm*—Kyle Eppele; Peter A. Lipovsky

(57) ABSTRACT

A directional neutron detecting apparatus includes first and second neutron detectors. Each neutron detector includes a thin planar sheet of neutron-reactive material; a first ohmic electrode operably coupled to one side of the planar sheet of neutron-reactive material; a second ohmic electrode operably coupled to a second side of the planar sheet of neutron-reactive material; a voltage source operably coupled to the first and second ohmic electrodes; and an electrical current detector operably coupled in series between the first ohmic electrode and the voltage source. The first and second neutron detectors are arranged so that their planar neutron-reactive sheets are substantially parallel, opposing and are spaced from each other. Multiple directional neutron detecting apparatuses may be arranged mutually orthogonally to thereby provide omni-directional neutron detection.

12 Claims, 5 Drawing Sheets

Relative count rate of opposed planar detectors (thick lines):

Angle of detector plane relative to incident neutron flux

OMNI-DIRECTIONAL SOLID-STATE THERMAL NEUTRON DETECTOR

CROSS-REFERENCE TO RELATED APPLICATION

This application is a continuation-in-part of prior U.S. patent application Ser. No. 10/322,813 now U.S. Pat. No. 7,372,009 filed 18 Dec. 2002 and issued 13 May 2008. This related U.S. Patent is incorporated by reference herein.

BACKGROUND

Commonly used thermal neutron detectors, such as gas proportional counters and scintillation counters, have the drawback of being bulky (not very portable) and are not capable of, or readily configured for, determination of the neutron flux direction (or the direction of a neutron source, which is opposite to neutron flux direction). Gas proportional counters also require high voltages, on the order of kilovolts, which can be electronically noisy and susceptible to arcing due to environmental conditions. Solid state neutron detectors based on silicon or germanium photodiodes and phototransistors exist also, but they are quite small in size, and typically require a neutron converter foil, such as gadolinium, in front of the semiconductor device.

It is thus desirable to have a thermal neutron detector that overcomes the above-described deficiencies and that is capable of readily determining the direction of neutrons arriving from any direction.

SUMMARY

A directional neutron detecting apparatus includes first and second neutron detectors. Each neutron detector includes a thin planar sheet of neutron-reactive material; a first ohmic electrode operably coupled to one side of the planar sheet of neutron-reactive material; a second ohmic electrode operably coupled to a second side of the planar sheet of neutron-reactive material; a voltage source operably coupled to the first and second ohmic electrodes; and an electrical current detector operably coupled in series between the first ohmic electrode and the voltage source. The first and second neutron detectors are arranged so that their planar neutron-reactive sheets are substantially parallel, opposing and are spaced from each other. Multiple directional neutron detecting apparatuses may be arranged mutually orthogonally to thereby provide omni-directional neutron detection.

Other objects, advantages and new features will become apparent from the following detailed description when considered in conjunction with the accompanied drawings.

DESCRIPTION

Figure 1:
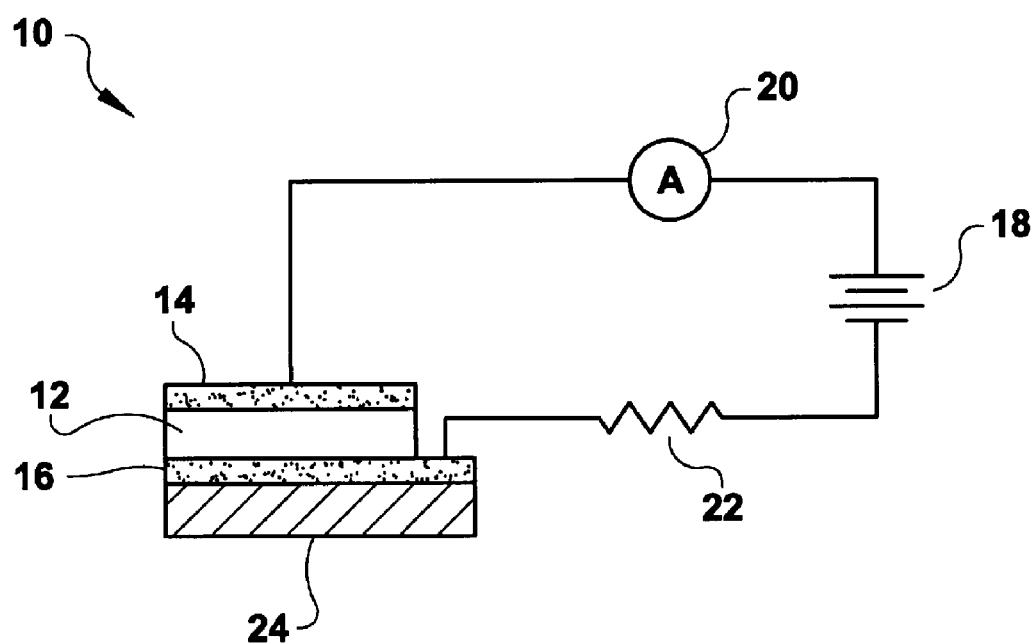
FIG. 1 shows an embodiment of a representative individual neutron detector according to the description herein.

Various fast neutron (energy greater than 1 eV) detectors with directional capability have been described by others. In a real world environment, however, by the time the neutrons reach the detector, most have been thermalized (energy reduced to thermal energies, or around 0.025 eV) by their interaction with hydrogen-containing materials, such as water vapor in the air, packaging material (wood and plastics), water in soil, and people. A thermal neutron detector with directional capability is therefore more practical than a fast neutron detector with directional capability.

Neutrons can be detected by measurement of the secondary charged particles that result from nuclear reactions such as:

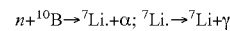
$$n + {}^{10}B \rightarrow {}^{7}Li.+\alpha;\ {}^{7}Li. \rightarrow {}^{7}Li+\gamma$$

where n represents a neutron, B represents a boron atom, Li. represents an excited lithium atom, and α represents an alpha particle (helium nucleus). The symbol Li represents a non-excited lithium atom and γ represents a gamma ray.

The 1.47 MeV alpha particles from this reaction create electron-hole pairs in the neutron-reactive material. Detection of these charge carriers before they recombine, or are captured by traps, indicates the presence of the incident neutrons. The isotope boron-10, with its relatively large cross section for thermal neutrons (3837 barns), is particularly well suited for neutron detection, and is commonly used in gas-type counter detectors in the form of boron trifluoride gas, $BF_3$.

A solid-type detector utilizing for example boron nitride, or another highly electrically resistive boron compound, will have a greatly enhanced total cross section for neutrons, and thus far better detector sensitivity for a given neutron-sensitive, or active, volume. For example, the total cross section increases by a factor of about 3000 in going from $BF_3$ gas (at room temperature and atmospheric pressure) to solid boron nitride (BN). In addition, the wide band gap of BN (around 6 eV for the cubic crystalline phase of BN) should have better room temperature detection operation, compared to other semiconductor solid-state nuclear particle detectors, because of reduced thermally induced recombination of electrons and holes. Finally, pure BN is a very stable compound that can withstand large variations in temperature and humidity without degradation, and thus is suitable for use in a portable detector unit that could be deployed in varied environments.

By applying an electric field across. BN, the free electrons created by the above-described reaction can be swept up by the boron nitride detector. Where a thin sheet of BN is used, the relative thinness of the BN permits voltages to be applied on the order of a few volts (rather than the kilovolts needed for bulk samples and gas-based detectors). However, the electrons must reach the electrodes producing the field before they recombine with the simultaneously generated holes or are captured by charge-trapping crystal defects.

Bulk BN, usually sintered from powder, contains many defects, including boron or nitrogen vacancies, impurities, grain boundaries, and porosity. Materials grown as films, deposited under the right conditions, can have better crystalline perfection and purity, and therefore fewer defects, than bulk polycrystalline solids.

The film growth of BN allows the choice of two different crystal phases: a hexagonal structure (hBN) analogous to the graphite form of carbon; and a cubic phase (cBN) analogous to the diamond form of carbon. The hexagonal form of boron nitride is widely available in large bulk pieces. These two phases of BN have different values of mass density, and can have different electrical properties, such as conductivity and carrier mobility. Based on these characteristics, one BN phase may be better suited for neutron detection than the other.

FIG. 1 illustrates a single neutron detector according to the description herein. As will be further described, such a single neutron detector is combined with another single neutron detector to provide what is termed here as a "directional neutron detecting apparatus." The directional neutron detecting apparatus may then be combined further with other directional neutron detecting apparatuses to enhance neutron directivity detection and to ultimately provide omni-direction neutron directivity detection.

Referring again to FIG. 1, a representative implementation of an individual neutron detector 10 shown. Each such individual detector 10 includes a semiconducting or insulating sheet 12 of neutron-reactive material sandwiched between two parallel conducting electrodes, shown as first ohmic electrode 14 and second ohmic electrode 16. As used herein, the term "ohmic" means that the circuit resistance of the interface or connection between the electrodes and sheet 12 is small compared to the resistance across the thickness of sheet 12. A relatively small voltage 18 (typically a few volts) applied between the two electrodes, produces an electric field within the neutron-reactive material sheet that, in the presence of free charge carriers in the sheet (produced by the above-described nuclear reaction), leads to measured current flow 20 in the external circuit supplying this voltage. The current will either be continuous (for high neutron flux), or in the form of charge pulses (for low neutron flux). Such a current is easily measured by well-known electronic amplification and discrimination techniques.

The amplitude of the current, or the signal rate of charge pulses, increases as the number of free charge carriers (electrons or holes) in the neutron-reactive sheet increases. This is due to an increase in the thermal neutron flux through the sheet. The current amplitude, or charge pulse rate, is therefore a measure of the neutron flux level. The electronics used for such measurements consist of simple low-power circuits that will be readily apparent to those of ordinary skill in this art.

In the representative schematic of individual neutron detector 10 shown in FIG. 1, current is measured with ammeter 20. The value of resistor 22 controls the voltage drop across sheet 12. Also shown in FIG. 1 is a separating layer 24 that is optional. Separating layer 24 could be used for desired structural reinforcement and/or where it facilitates the manufacturing of detector 10. This layer could also include neutron opaque qualities where considered an aid in neutron directivity assessment.

The detection method described here is useful for neutron flux levels that are high enough to generate a steady current that flows in addition to background, or dark, current. The total measured current will thus be the sum of the dark current and this additional, or excess, current. For low neutron flux levels, the excess current will take the form of charge pulses. In such a case, more complex but well-known circuitry can be used to detect and count these current pulses.

For both measurement methods, the excess current is due to the free charge carriers produced by the interaction of thermal neutrons with the neutron-reactive sheet in the detector. The amplitude of a continuous excess current, or the signal rate of charge pulses, is therefore proportional to the neutron flux at the detector.

The neutron-reactive sheet should be substantially defect-free or else the free carriers produced by the nuclear reaction will be captured at defect sites before they can reach the detector electrodes. Also, the electrical contact between the neutron-reactive sheet and the electrodes should be conducting enough that the excess current is not blocked from flowing in the external measurement circuit. An ohmic contact will assure that this condition is met, and is considered superior to a Schottky-barrier contact.

In addition, the electrical properties of the neutron-reactive sheet must meet certain requirements, as will be illustrated in an example presented below. These electrical properties include carrier lifetime $\tau$, carrier mobility $\mu$, and resistivity $\rho$. The mobility-lifetime product $\mu\tau$ is the distance a free charge carrier will travel, per unit applied electric field E, before capture, trapping, or recombination. The distance $\mu\tau E$ must therefore be on the order of the thickness of the neutron-reactive material for freed charge carriers to reach the device electrodes. Also, the neutron-reactive material resistivity must be high enough that the background, or dark, current (i.e., the current flowing when no neutrons are incident on the detector) is small compared to the current generated by the detection process.

For example, for a dark current of 1 nA and a BN detector element with a 1 $\mu$m thickness, 1 $cm^2$ area, and a resistivity of $10^{10}$ $\Omega$-cm, the minimum required value of $\mu\tau$ is $10^{-5}$ $cm^2/V$. To be practical, $\mu\tau$ should be several times this value so that the detection current is much greater than the dark current. If this requirement is not met, the detection current will be overshadowed by the dark current, and therefore not easily measured.

Figure 2:
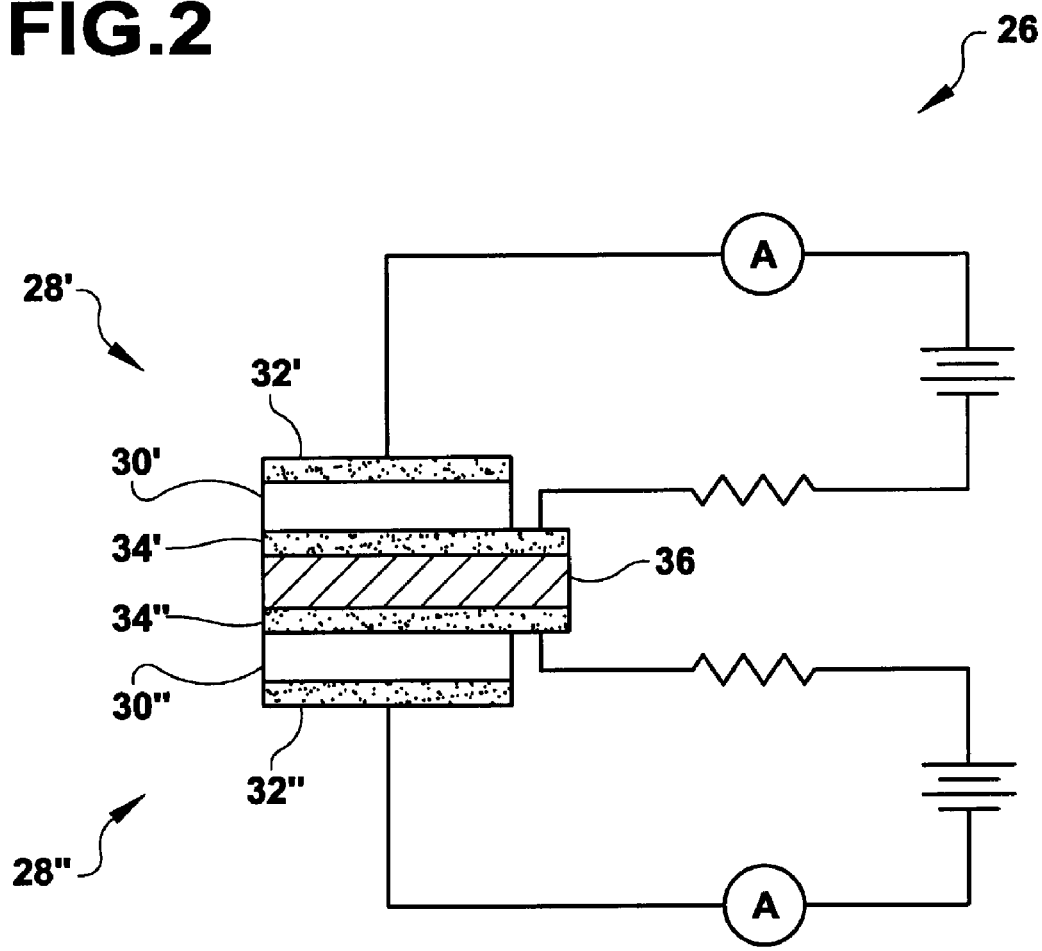
FIG. 2 shows one embodiment of a representative directional neutron detecting apparatus according to the description herein.

FIG. 2 illustrates a first representative embodiment of a directional neutron detecting apparatus 26. Apparatus 26 includes first 28' and second 28" neutron detectors. Each of these detectors includes a planar neutron-reactive sheet 30' and 30", a first ohmic electrode 32' and 32" operably coupled to one side of the sheets 30' and 30", respectively, and second ohmic electrodes 34' and 34" operably coupled to a second side of sheets 30' and 32", respectively. As can be seen in this figure, sheets 30' and 30" are arranged to be substantially parallel, opposing and spaced from each other. Shown as part of detectors 28' and 28" are previously described accompanying electronics, as identified and referenced in the description of the embodiment shown in FIG. 1. Also shown in FIG. 2 is a separating layer 36 that is shared by detectors 28' and 28". Layer 36 is placed between the neutron detectors.

Figure 3:
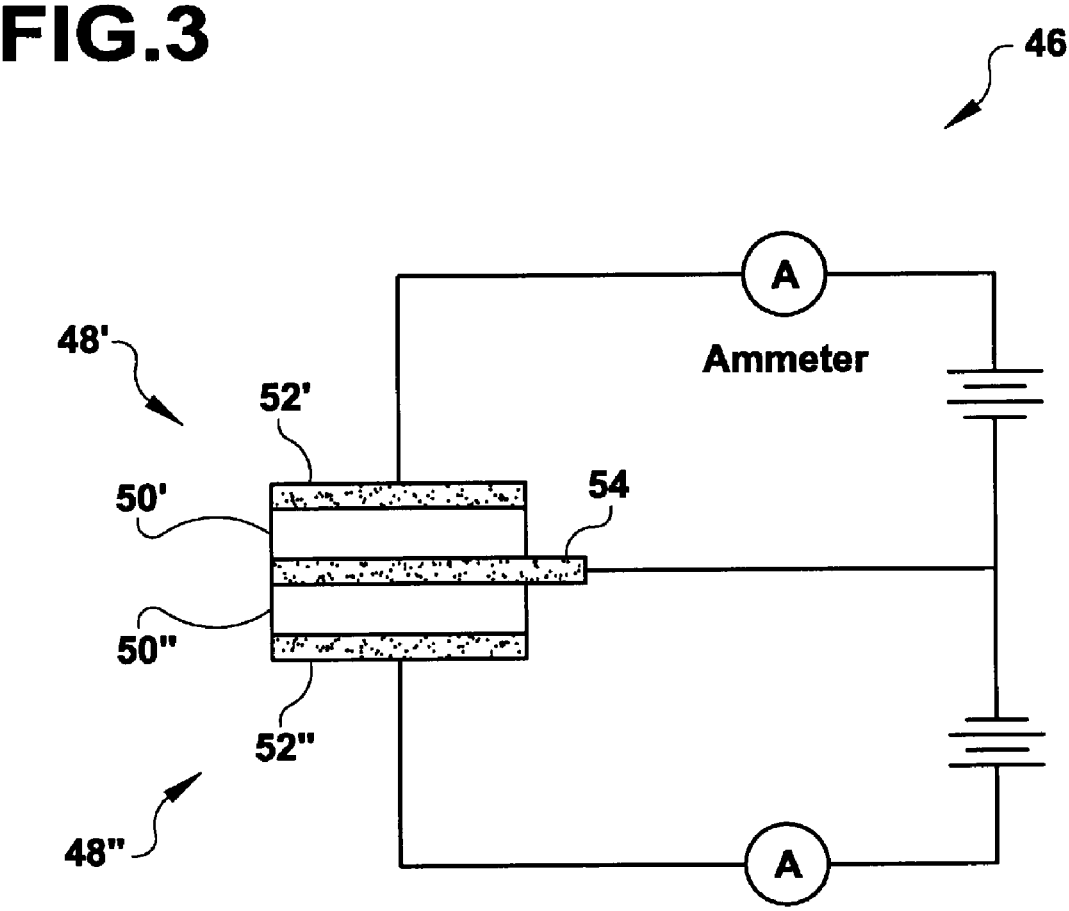
FIG. 3 shows another embodiment of a representative directional neutron detecting apparatus according to the description herein.

In FIG. 3, a second representative embodiment of a directional neutron detecting apparatus is shown. Directional neutron detecting apparatus 46 includes first 48' and second 48" neutron detectors. Each of these detectors includes a planar sheet of neutron-reactive material 50' and 50", a first ohmic electrode 52' and 52"operably coupled to one side of the sheets 50' and 50", respectively, and a second ohmic electrode 54 common to both detectors and operably coupled to a second side of sheets 50' and 50", respectively. As can be seen in this figure, sheets 50' and 50" are arranged to be substantially parallel, opposing and spaced from each other. Shown as part of detectors 28' and 28" are previously described accompanying electronics, as have been identified and referenced in the embodiment shown in FIG. 1.

Figure 4A:
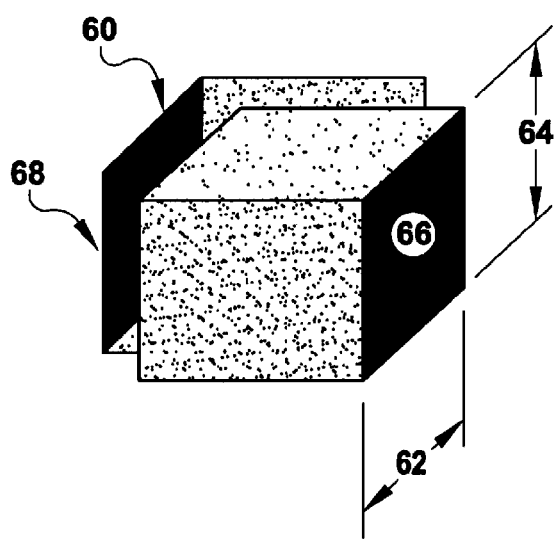
FIG. 4A shows an example embodiment according to the description herein wherein three directional neutron detecting apparatuses are arranged in a cube configuration.

An omni-directional neutron detector is made possible by arranging three directional neutron detecting apparatuses orthogonally (i.e., oriented at right angles with respect to each other). This arrangement may take many forms, the cube and cube corner, being two examples of such configurations. FIG. 4A illustrates a cube configuration wherein each pair of opposing sides of the cube makes up a directional neutron detecting apparatus, in this instance, one of three orthogonally arranged pairs. In the illustration, the opposing sides have been like-shaded and slightly off-set for clarity.

Figure 4B:
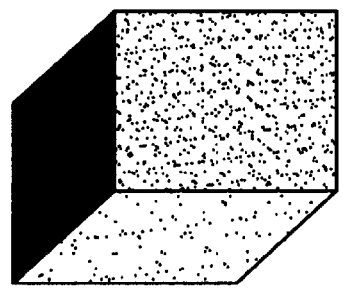
FIG. 4B depicts another example embodiment according to the description herein wherein three directional neutron detecting apparatus elements are arranged in a cube-corner configuration.

Another exemplary configuration is that of a cube corner, shown in FIG. 4B, wherein each plane of the corner consists of a single directional neutron detecting apparatus, including two planar neutron detectors that are stacked back-to-back.

For these and other configurations, each detector absorbs a substantial fraction of the incident thermal neutrons, thereby facilitating determination of the neutron flux direction. This absorption characteristic will now be discussed in greater detail.

Consider the aspect ratio of a detector to be the ratio of a linear dimension of a planar face of the neutron-reactive sheet, such as width, length or diameter, for example, to the thickness of the sheet. This aspect ratio can be from about 10 to 1000 or more. A detector having a neutron-reactive sheet of such a high aspect ratio means that essentially all detected neutrons enter the detector from one side or the other, and essentially no detected neutrons enter the detector edge-on. The highly two-dimensional nature of the planar detector can therefore be used to determine if the neutrons approach from the left or from the right of the neutron-reactive sheet (looking at the detector edge-on). Note, however, that if only one detector is used, the detected neutrons could have come from either the left or from the right of the detector. There is no way of knowing from which of these two directions the neutrons were incident on the detector.

By combining two planar detectors (with parallel and overlapping planes), each of which absorbs some or all of the incident thermal neutrons, the neutron origination direction can be determined.

Consider the case where both detectors are opaque to the transmission of incident neutrons. In that case, a detected neutron came from the left if detected by the left-hand detector, and from the right if detected by the right-hand detector. For the case where some but not all of the incident thermal neutrons are absorbed by an individual detector (but both the left- and right-hand detectors each absorb the same fraction of neutrons), the neutrons are incident from the left if the detection or count rate (neutrons detected per second, or counts per second) is higher for the left-hand detector, and from the right if the count rate is higher for the right-hand detector.

As described above, a pair of parallel, overlapping planar detectors (the pair forming a single neutron detecting apparatus) can be combined with two other such detecting apparatuses, such that the three detecting apparatuses are oriented at right angles to each other, as shown in FIGS. 4A-4B. In these figures, accompanying electronics have been removed for visual clarity. FIG. 4A is also used to illustrate the above-described aspect ratio of a detector, not drawn to scale, wherein a thickness 60 is shown in relation to a width 62 and length 64 of a planar face 66 of planar sheet 68 of neutron-reactive material.

Figure 5:
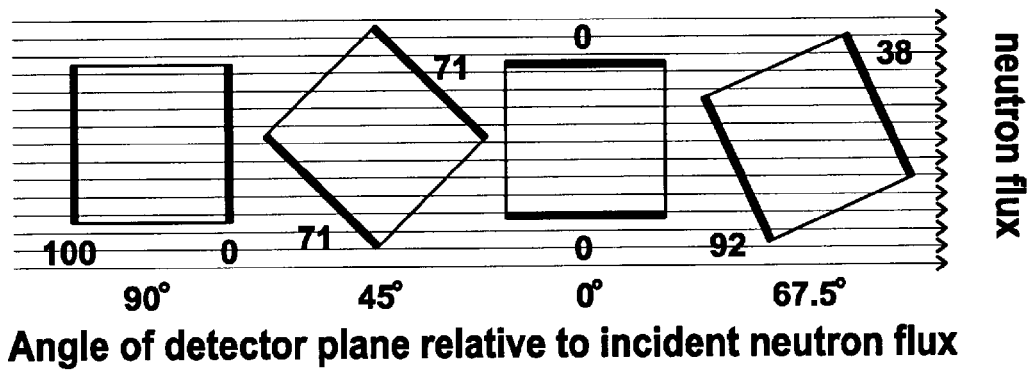
FIG. 5 illustrates relative count rate as received by a variously oriented directional neutron detecting apparatus.

By measuring and comparing the thermal neutron detection count rate for each of the six detectors, the direction (in 3-dimensional space) of the incident neutron flux can be determined. An example of looking edge-on at a pair of parallel detectors (a single neutron detecting apparatus), each opaque to the transmission of thermal neutrons for illustration purposes, is shown in FIG. 5. In this figure, the arrows show the direction of the neutron flux.

The omni-directional neutron detector disclosed herein has potential use in the inspection of nuclear radiating sources, the monitoring of nuclear worker safety, hazardous materials assessment, and nuclear weapons surveying.

In the omni-directional neutron detector described herein, neutron flux direction can be determined using non-opaque neutron detectors. For example, suppose each detector transmits 20% (or absorbs 80%) of the thermal neutrons that are incident normally (i.e., at an angle of 90°) on the detector's neutron-reactive plane. For a neutron flux incident from the left (looking edge-on at the detector pair), the left-hand detector will detect 80% of the incident thermal neutrons, and the right-hand detector will detect 16% of the incident thermal neutrons (80% of the 20% transmitted by the left-hand detector). Because the left-hand detector detects more neutrons than the right-hand detector, the neutron flux is determined to be from the left rather than the right.

Alternatively, each planar detector, even if not thick enough to be completely opaque to the transmission of thermal neutrons, could be backed by a sheet of material (such as cadmium) that blocks any transmitted neutrons and still achieve the same directionality capability, albeit at the possible expense of detection sensitivity. This approach simplifies assessment of the neutron flux direction.

The BN sheet, such as described herein, could be formed as a film using any number of known production techniques. The BN portion of the detector could also be a bulk form of the material, rather than a film. The bulk BN will need to meet the same property requirements discussed above, and be thin enough to (1) permit the use of relatively low electrode voltages and (2) have a high enough aspect ratio to provide the capability of neutron flux direction determination.

Neutron-reactive materials other than BN, such as other boron-containing compounds, or other materials containing chemical elements that have a high cross section of reaction with thermal neutrons, could also be used in the individual neutron-reactive detectors. Combinations of various materials (one of which must be a good reaction target for thermal neutrons), in the form of alloys, superlattices, or multi-layers, for example, are also possible candidates. Some example neutron-reactive materials are boron, gadolinium, lithium, cadmium, samarium, europium, a boron compound, a gadolinium compound, a lithium compound, a cadmium compound, a samarium compound and a europium compound.

Additional individual detectors elements could be stacked (back-to-back) to increase the percentage of neutrons that react with the neutron-reactive material (effectively increasing the neutron-reactive material thickness), or placed side-by-side in an array (effectively increasing the neutron-reactive material area). In the case of an omni-directional detector in the form of a cube, each cube face could consist of two or more individual neutron detecting apparatuses stacked back-to-back or placed side-to-side.

The electrodes for either the hexagonal or cubic form of BN could be made, for example, of metals compatible with BN, or be of highly doped (and therefore relatively highly conducting) BN itself. Another way to configure a single detector is to use alternating layers of neutron-reactive material and electrode material, with the voltage on each electrode layer opposite to that on the next nearest electrode layer. When a substrate is used in conjunction with a detector, it could act as an bottom (or top) electrode for the neutron-reactive layer. The substrate could also act as a top electrode for a neutron-reactive sheet on one side of the substrate, and as the bottom electrode for a neutron-reactive sheet on the other side of the substrate.

Of the two common BN crystal phases, hexagonal and cubic, the latter is denser by a factor of about 1.5, and so the total neutron absorption cross section of cBN is 1.5 times larger than that of hBN. Also, the percentage of the boron-10 isotope in naturally occurring boron is 19.6%. By enriching the boron content of a BN detecting element to 100% boron-10, a further increase in neutron absorption cross section by a factor of about 5 can be obtained.

If desired, the omni-directional neutron detector disclosed herein could also be used to detect the presence and direction of a fast neutron flux by encasing the detector in a neutron moderating material such as polyethylene. Alternatively, each detecting apparatus, or each individual detector, could be encased in such a material.

Compared to gas proportional counters and scintillation counters, the disclosed omni-directional neutron detector is a very compact device, and has the advantage of being able to determine incident neutron flux direction (from any spatial direction).

The total thickness of the neutron-reactive detector sheet would typically be less than 1 mm. The area of a single neutron-reactive detector sheet would be on the order of a few square centimeters (depending on the sheet thickness and electrical properties, as well as the desired detection sensitivity). The volume of an omni-directional detector comprising three neutron detecting apparatuses would range approximately from approximately 1 to approximately 100 $cm^3$. Because the voltage applied across a BN neutron-reactive sheet is on the order of a few volts, compared to kilovolts for prior art detectors, problems associated with high voltage (arcing, and the extra space or insulation needed to prevent arcing) are avoided. Operation at low voltage also means that the electronics used to apply the electrode voltage and to measure the detector current can be simpler, more compact, safer to the user, and much less power consuming.

Obviously, many modifications and variations are possible in light of the above description. It is therefore to be understood that within the scope of the claims, the invention may be practiced otherwise than as has been specifically described.

What is claimed is:

1. A directional neutron detecting apparatus comprising:
    a first neutron detector, said first neutron detector including
        a planar sheet of neutron-reactive material;
        a first ohmic electrode operably coupled directly to one side of said planar sheet of neutron-reactive material;
        a second ohmic electrode operably coupled directly to a second side of said planar sheet of neutron-reactive material;
        a voltage source operably coupled to said first and second ohmic electrodes; and
        an electrical current detector operably coupled in series between said first ohmic electrode and said voltage source, and
    a second neutron detector, said second neutron detector including
        a planar sheet of neutron-reactive material;
        a first ohmic electrode operably coupled directly to one side of said planar sheet of neutron-reactive material;
        a second ohmic electrode operably coupled directly to a second side of said planar sheet of neutron-reactive material;
        a voltage source operably coupled to said first and second ohmic electrodes; and
        an electrical current detector operably coupled in series between said first ohmic electrode and said voltage source,
    wherein said first and second neutron detectors are arranged so that their planar sheets of neutron-reactive material are substantially parallel, opposing and are spaced from each other and wherein said planar sheets of neutron-reactive material each have a thickness and a planar face, said planar face having a linear dimension wherein said planar sheet is categorized by an aspect ratio, said aspect ratio being a ratio of said linear dimension to said thickness of said neutron-reactive material sheet, and further wherein said aspect ratio is at least 10.

2. The directional neutron detecting apparatus of claim 1 wherein said second ohmic electrode of said first neutron detector and said second ohmic electrode of said second neutron detector are one and the same.

3. The directional neutron detecting apparatus of claim 1 wherein a separating layer is positioned between said neutron detectors.

4. The directional neutron detecting apparatus of claim 3 wherein said separating layer is a supporting substrate.

5. The directional neutron detecting apparatus of claim 3 wherein said separating layer is substantially opaque to neutrons.

6. The directional neutron detecting apparatus of claim 1 wherein each of said first and second neutron detectors further include a resistor operably coupled between the corresponding detector's voltage source and second ohmic electrode.

7. The directional neutron detecting apparatus of claim 1 wherein a first said directional neutron detecting apparatus is disposed orthogonally with respect to another said directional neutron detecting apparatus.

8. The directional neutron detecting apparatus of claim 1 wherein three of said directional neutron detecting apparatuses are configured into a cube configuration.

9. The directional neutron detecting apparatus of claim 1 wherein three of said directional neutron detecting apparatuses are configured into a cube-corner configuration.

10. The directional neutron detecting apparatus of claim 1 wherein said aspect ratio is approximately 1000.

11. The directional neutron detecting apparatus of claim 10 wherein said neutron-reactive material is selected from the group consisting essentially of boron, gadolinium, lithium, cadmium, samarium, europium, a boron compound, a gadolinium compound, a lithium compound, a cadmium compound, a samarium compound and a europium compound.

12. The directional neutron detecting apparatus of claim 1 wherein said neutron-reactive material is selected from the group consisting essentially of boron, gadolinium, lithium, cadmium, samarium, europium, a boron compound, a gadolinium compound, a lithium compound, a cadmium compound, a samarium compound and a europium compound.

* * * * *